United States Patent
Lansley et al.

[11] Patent Number: 6,028,822
[45] Date of Patent: Feb. 22, 2000

[54] CONFIGURATION OF SOURCE AND RECEIVER LINES FOR 3-DIMENSIONAL SEISMIC ACQUISITION

[75] Inventors: Roy Malcolm Lansley, Bellville; Gary Joseph Elkington, Houston; Nicholas John Battaglino, III, Kingwood, all of Tex.

[73] Assignee: Western Atlas International, Inc., Houston, Tex.

[21] Appl. No.: 09/175,066

[22] Filed: Oct. 19, 1998

Related U.S. Application Data

[63] Continuation-in-part of application No. 08/933,853, Sep. 19, 1997, abandoned, which is a continuation of application No. 08/604,761, Feb. 19, 1996, abandoned.

[51] Int. Cl.⁷ .................................................. G01V 1/20
[52] U.S. Cl. .............................. 367/62; 367/58; 367/61
[58] Field of Search ............................ 367/56, 58, 59, 367/15, 51, 21, 61, 72

[56] References Cited

U.S. PATENT DOCUMENTS

| | | | |
|---|---|---|---|
| 4,476,552 | 10/1984 | Water et al. | 367/56 |
| 5,285,423 | 2/1994 | Zachariadis et al. | 367/56 |
| 5,402,391 | 3/1995 | Cordsen | 367/56 |
| 5,430,689 | 7/1995 | Rigsby et al. | 367/15 |
| 5,487,052 | 1/1996 | Cordsen | 367/56 |
| 5,648,938 | 7/1997 | Jakubowicz | 367/56 |
| 5,787,051 | 7/1998 | Goodway et al. | 367/56 |

*Primary Examiner*—Christine K. Oda
*Assistant Examiner*—Anthony Jolly
*Attorney, Agent, or Firm*—Madan, Mossman & Sriram, P.C.

[57] ABSTRACT

A method for performing a seismic survey with even fold. An inline direction and a crossline direction are selected. Seismic signals are generated at a plurality of source locations positioned along one or more source lines. The source locations are substantially equally spaced, and the source lines are substantially parallel to each other. Seismic signals are detected at a plurality of receiver locations positioned along a plurality of receiver paths having longitudinal axes parallel to the inline direction, and substantially equally spaced in each receiver path. Each receiver path is positioned along its axis, and extends in a regular pattern on both sides of the axis. The axes are substantially parallel to each other. A desired fold, $F_i$, is determined in the inline direction, and a desired fold, $F_x$, is determined in the crossline direction. A number of receiver channels, $NC_i$, per receiver path in the inline direction, a spacing, $RI_i$, between receiver locations in the inline direction, a number, $NRL_x$, of receiver paths in the crossline direction, and a number, $NS_x$, of source locations in the crossline direction are determined. Spacing, $SI_i$, between source locations in the inline direction satisfying the expression $F_i=(NC_i \times RI_i)/(2 \times SI_i)$, and spacing, $SI_x$ between source locations in the crossline direction, and distance, $R_x$, rolled in the crossline direction which satisfy the expression $F_x=(NRL_x \times NS_x \times SI_x)/(2 \times R_x)$ are selected.

20 Claims, 18 Drawing Sheets

CONFIGURATION OF SOURCE AND RECEIVER LINES FOR 3-DIMENSIONAL SEISMIC ACQUISITION

CROSS REFERENCE TO RELATED APPLICATIONS

This is a continuation-in-part of application Ser. No. 08/933,853, filed on Sep. 19, 1997, abandoned, which is itself a continuation of application Ser. No. 08/604,761, filed on Feb. 23, 1996, abandoned.

BACKGROUND OF THE INVENTION

1. Field of the Invention

The invention relates generally to seismic surveying and, more particularly, to a method for positioning seismic sources and seismic receivers in performing seismic surveys.

2. Description of the Related Art

Seismic surveying is used for determining the structure of subterranean strata. Seismic surveying typically uses a seismic energy source, such as explosive charges or mechanical vibrators, and seismic receivers, such as geophones or accelerometers. The seismic energy source generates acoustic waves which propagate through the subterranean strata and reflect from acoustic impedance differences generally at the interfaces between strata. The reflected waves are detected by the seismic receivers, which generate representative electrical signals. The resulting signals are transmitted by electrical, optical, or radio telemetry to a location where the signals are recorded for later processing and interpretation. The measured travel times of the reflected waves from the source to the receiver locations and the characteristics of the received energy, such as amplitude, provide information concerning the subterranean strata. Seismic surveys are interpreted to determine the most suitable locations for drilling wells for production of hydrocarbons.

The seismic receivers detect noise from many sources known in the art, and detect multiple reflections, as well as the primary reflected waves which are of interest in determining the subsurface structures. The noise and multiple reflections obscure the desired signal and complicate the process of seismic data analysis. A common technique for enhancing the signal-to-noise and primary-to-multiple ratios is the use of multiple"fold" data. This technique activates the seismic source at a plurality of locations for detection by multiple seismic receivers. The seismic signals received over time are"gathered" by identifying those seismic signals or"traces" corresponding to the same subsurface reflection point, such as a common depth point (CDP) or a common midpoint (CMP). The traces in each gather are "stacked". Stacking is the process of summing together the traces so that the coherent primary signal is enhanced by in-phase addition while source-generated and ambient noise are attenuated by destructive interference. The number of traces in each common point gather is termed the fold or multiplicity.

Two-dimensional (2-D) seismic surveys typically utilize a simple linear recording geometry. A receiver "group" of one or more receivers is positioned at each receiver station, or location, and the receiver locations are arranged in a single line. The receiver locations are typically equally spaced along the receiver line, giving a constant group interval, or spacing, between receiver locations. The source stations or locations are generally collinear or parallel to the receiver line. Multiple fold data is obtained by moving the source location relative to the receiver line so as to maintain a common depth point for multiple pairs of source and receiver locations. The source locations are typically equally spaced, giving a constant source interval or spacing between source locations.

Three-dimensional (3-D) seismic surveys utilize more complex recording geometries. 3-D recording geometries known in the art typically use multiple parallel receiver lines of seismic receivers, typically with the receiver locations equally spaced along the receiver lines and the receiver lines equally spaced from each other. Source locations are typically positioned along source lines and typically are evenly spaced. The source lines are typically orthogonal to the receiver lines, but may also be parallel to or at a diagonal angle, typically 45 degrees, to the receiver lines. In 3-D surveys, gathers are constructed by taking all seismic traces from an area, referred to as a "bin", around each common midpoint and assigning the traces to that common midpoint. The areal dimensions of the bin are generally half the group interval by half the source interval. The size of the source interval is independent of the size of the group interval, allowing the use of rectangular bins rather than square bins. Seismic recording methods using these geometries are generally termed "swath" methods. As data are recorded along one swath, one or more of the receiver lines are picked up and replaced on the other side of the recording spread to be used in the next swath, a process termed rolling, rolling along, or rolling over. A uniform fold, in which each rollover develops the same positive integer value for multiplicity, is termed an even fold. Maintaining an even fold constrains the number of receiver lines recorded, the number of receiver lines which are rolled over each time, and the location of sources relative to the receiver spread. Increasing the fold requires increasing the number of receiver lines or decreasing the source line interval, thus increasing the number of source locations.

An alternative 3-D recording geometry, called a button patch or patch system developed by Atlantic Richfield Company (ARCO), is described in Crews, G. A. et al., *An Economical High-Resolution 3-D Seismic Survey Technique*, Extended Abstracts, 61st Annual International Meeting, Society of Exploration Geophysicists, 90, 863–866 (1991). Seismic receivers are positioned in multiple sets of rectangular patches of receiver groups. The patches are called buttons and are interspaced in checkerboard fashion with rectangular empty spaces called button-holes. The sources are positioned at various locations both within and outside the button patch. These and other recording geometries are described in Stone, D. C., *Designing Seismic Surveys in Two and Three Dimensions*, Society of Exploration Geophysicists, Tulsa (1994).

SUMMARY OF THE INVENTION

The invention is a method for performing a seismic survey with even fold. The method includes selecting an inline direction and a crossline direction perpendicular to the inline direction; generating seismic signals at a plurality of source locations, the source locations being positioned along each of one or more source lines. The source locations are substantially equally spaced in each of the source lines. The source lines are substantially parallel to each other. The seismic signals are detected at a plurality of receiver locations. The receiver locations are positioned along a plurality of receiver paths having longitudinal axes parallel to the inline direction. The receiver locations are substantially equally spaced along each of the receiver paths, each of the receiver paths being positioned generally along a longitudinal axis, each receiver path extending in a regular pattern to both sides of the longitudinal axis. The longitudinal axes are substantially parallel to each other. A desired fold, $F_i$, is determined in the inline direction. A desired fold, $F_x$, is determined in the crossline direction. A number of receiver recording channels, $NC_i$, available per receiver path is determined in the inline direction. A spacing, $RI_i$, is determined between the receiver locations in the inline direction. A number, $NRL_x$, of the receiver paths is determined in the crossline direction, and a number, $NS_x$, of the source locations is determined in the crossline direction. A spacing, $SI_i$, is selected between the source locations in the inline direction, satisfying the expression:

$$F_i = (NC_i \times RI_i)/(2 \times SI_i)$$

and selecting a spacing, $SI_x$ between the source locations in the crossline direction and a distance, $R_x$, rolled in the crossline direction, which satisfies the expression:

$$(NRL_x \times NS_x \times SI_x)/(2 \times R_x).$$

DESCRIPTION OF THE PREFERRED EMBODIMENTS

Figure 1:
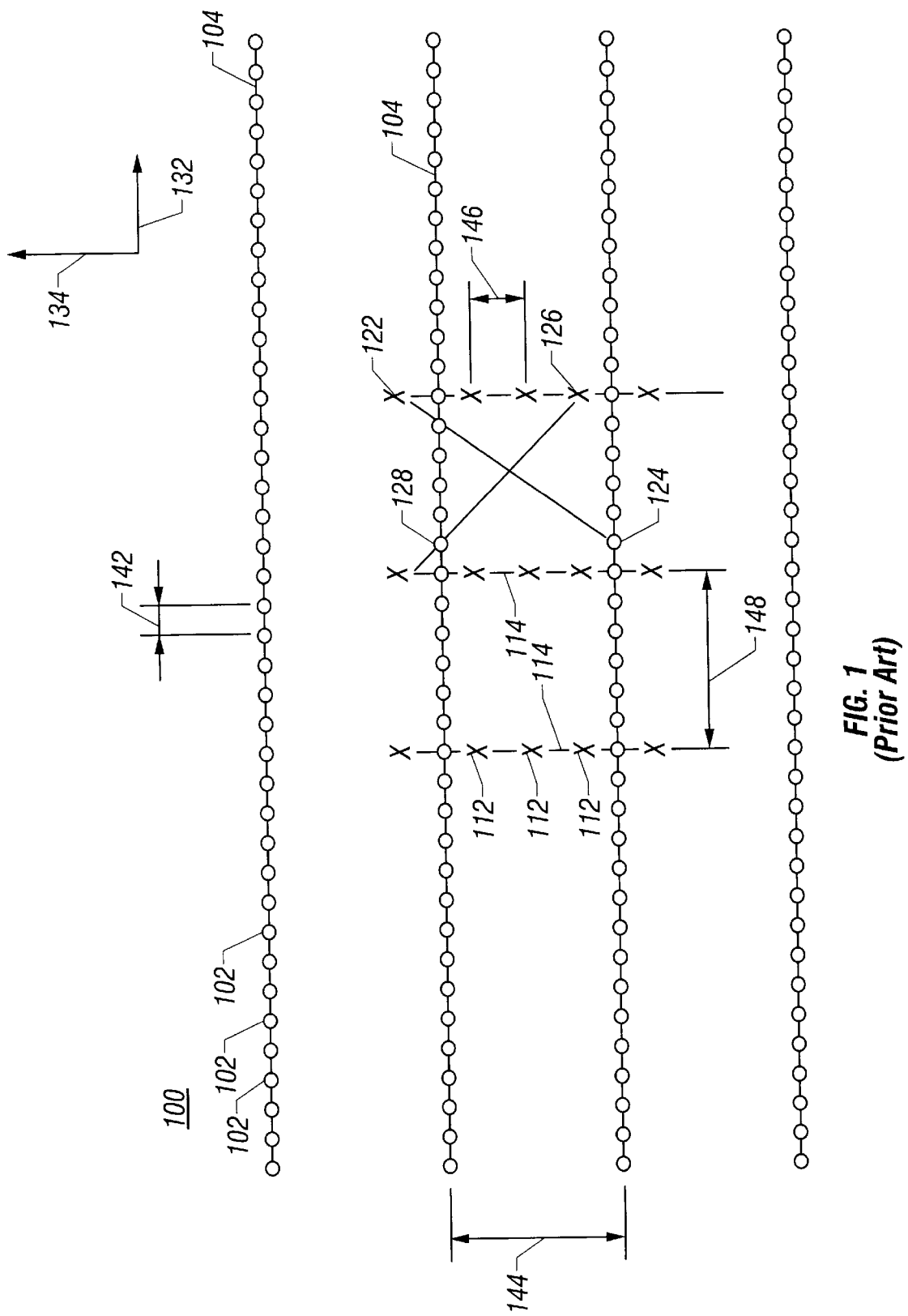
FIG. 1 is a diagrammatic view of the source and receiver array for the conventional swath method for performing a seismic survey.

FIG. 1 shows a diagrammatic view of the source and receiver array for the conventional swath method for performing a seismic survey. The method is generally designated as 100. A plurality of seismic receivers are positioned at receiver locations 102 spaced along a plurality of receiver lines 104. Each receiver location 102 may contain one or more receivers arranged in a receiver group. Typically, the receiver locations 102 are substantially equally spaced along each receiver line 104, as shown in FIG. 1. Typically, the receiver lines 104 are substantially straight lines, are substantially parallel to each other, and are substantially equally spaced from each other, as shown in FIG. 1. Variations from true straightness, equal spacing, or parallelism in either the receiver locations 102 or the receiver lines 104 are usually due to obstacles in the local terrain.

One or more seismic sources are positioned at one or more source locations 112. Typically, the source locations 112 are positioned along source lines 114 and the source locations 112 are substantially equally spaced along each source line 114, as here depicted. Typically, the source lines 114 are substantially straight lines, are substantially parallel to each other, and are substantially equally spaced from each other, as shown in FIG. 1. Variations from straightness, equal spacing, or parallelism in either the source locations 112 or the source lines 114 are usually due to obstacles in the local terrain. Typically, the source lines 114 are positioned substantially perpendicular to the receiver lines 104, as here depicted. However, the source lines 114 may be positioned substantially parallel to or diagonally to the receiver lines 104.

A recording geometry develops "fold" or multiplicity when the seismic signals from multiple pairs of source locations 112 and receiver locations 102 share a common midpoint. An example is shown in FIG. 1 where the two specific pairs of source location 122 with receiver location 124 and source location 126 with receiver location 128 share the same common midpoint 130. In three dimensional (3-D) recording geometries, fold can occur in both the "inline" and the "crossline" directions. By convention in the art of seismic surveying, the direction parallel to the direction of the receiver lines 104 is termed the inline direction. The direction perpendicular to the inline direction is then termed the crossline direction. The inline direction is shown by an arrow 132, while the crossline direction is shown by another arrow 134. The fold in the inline direction is given by Eq. (1):

$$F_i = (NC_i \times RI_i)/(2 \times SI_i) \qquad (1)$$

where $F_i$=fold in inline direction, $NC_i$=number of receiver recording channels available per receiving line in the inline direction, $RI_i$=spacing between receivers in the inline direction, and $SI_i$=spacing between sources in inline direction.

Similarly, the fold in the crossline direction is given by Eq. (2):

$$F_x = (NRL_x \times NS_x \times SI_x)/(2 \times R_x) \qquad (2)$$

where $F_x$=fold in crossline direction, $NRL_x$=number of receiver lines in the crossline direction for each crossline roll, $NS_x$=number of sources in the crossline direction, $SI_x$=spacing interval between sources in the crossline direction for each crossline roll, and $R_x$=distance rolled in the crossline direction for each crossline roll.

Generally, the spacing between receivers in the inline direction is the spacing between receiver locations 102 along the receiver line 104, while the spacing between receivers in the crossline direction is the spacing between receiver lines 104. The spacing between receiver locations 102 along the receiver line 104 is shown in FIG. 1 by the length 142, while the spacing between receiver lines 104 is shown by the length 144. The spacings between sources in the inline and crossline directions depend upon the existence and orientation of source lines 114. Thus, in FIG. 1, in which the source locations 112 are in source lines 114 perpendicular to the receiver lines 104, the spacing between sources in the crossline direction is the spacing between source locations 112 along the source line 114, while the spacing between sources in the inline direction is the spacing between source lines 114. The spacing between source locations 112 along the source line 114 is shown by the length 146, while the spacing between source lines is shown by the length 148.

The total fold F is given by the product of the inline and crossline folds, as given by Eq. (3):

$$F = F_i \times F_x. \quad (3)$$

Figure 2:
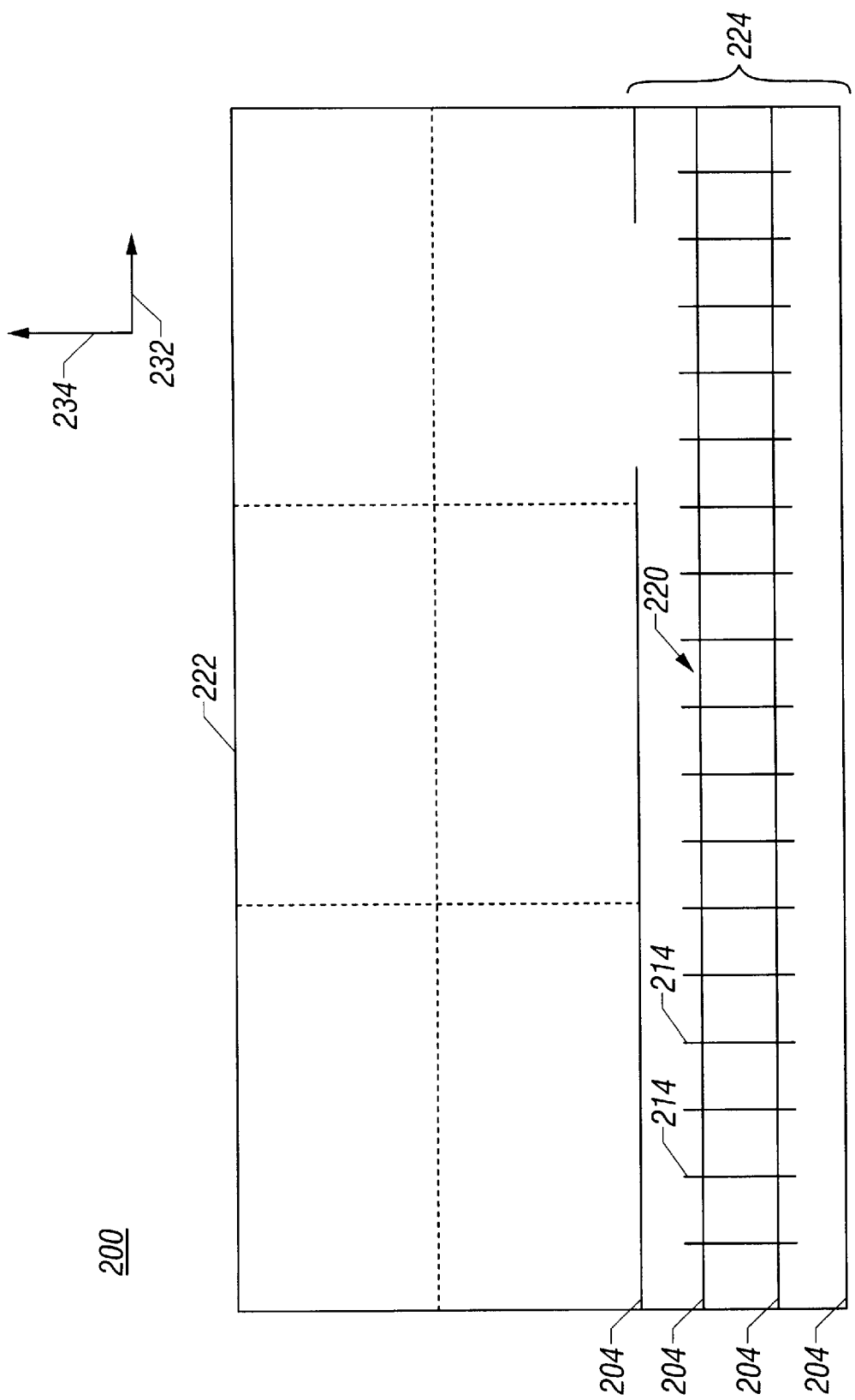
FIG. 2 is a diagrammatic view of the conventional swath method of seismic surveying.

FIG. 2 shows a diagrammatic view of the conventional swath method of seismic surveying. The method is generally designated as 200. The arrangement of receiver lines 204 and source lines 214 is termed a source and receiver patch 220 or template. The inline direction is shown by an arrow 232, while the crossline position is shown by another arrow 234. Typically, the pattern of receiver lines 204 in the patch 220 for a conventional swath recording geometry is longer in the inline direction than in the crossline direction, due to the length of the receiver lines 204 compared to the number and spacing of the receiver lines 204. The source lines 214 may need to be moved, typically in the inline direction, until the entire patch 220 is covered. The patch 220 itself may or may not cover the entire area 222 to be surveyed, in either the inline or crossline direction. The coverage problem is solved by moving the patch 220 in steps around the survey area until each portion of the survey area is covered in turn. Typically, the patch 220 is first moved, or rolled along, in the inline direction as many times as necessary to cover the inline extent of the area to be surveyed. Typically, the increment of roll along in the inline direction is the source line spacing. The coverage from the series of inline roll alongs is termed a swath 224 and gives the conventional recording geometry its name. Second, the patch 220 is rolled along in the crossline direction and another swath 224 is completed in the inline direction. As many swaths 224 in the crossline direction are made as necessary to cover the crossline extent of the area to be surveyed. The roll along of the patch 220 in the crossline direction from one swath 224 to the next can be of the total number of receiver lines 204 or of a selected lesser number of receiver lines 204 each time. If a recording geometry utilizes N receiver lines 204 at a time, it is generally termed an N line swath, where N is usually an even integer. If R is the number of receiver lines 204 picked up and rolled over each time in an N line swath, then an overlap of (N-R) receiver lines 204 will be common to adjacent swaths 224. The increment of roll along in the crossline direction will thus be an integral number, R, of receiver line spacings. If the source lines 214 were parallel to the receiver lines 204, then typically the increment of roll along in the crossline direction would be the receiver line spacing.

Figure 3:
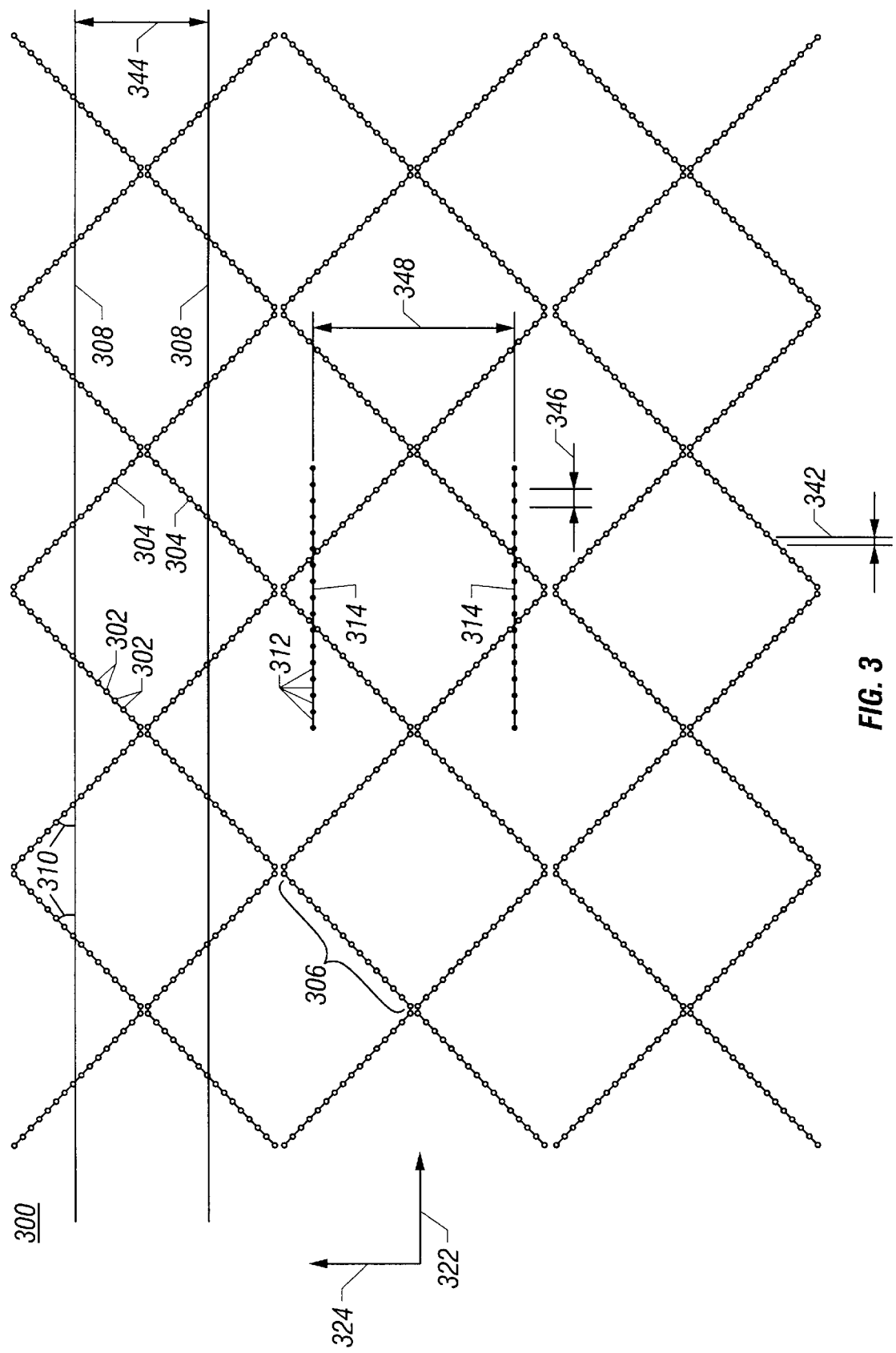
FIG. 3 is a diagrammatic view of the method of the present invention for performing a seismic survey.

FIG. 3 shows a diagrammatic view of the method of the present invention for performing a seismic survey. The method is generally designated as 300. A plurality of receivers are positioned at receiver locations 302 spaced along a plurality of receiver lines 304. Each receiver location 302 may contain one or more receivers arranged in a receiver group. In the preferred embodiment, the receiver locations 302 are substantially equally spaced along each receiver line 304. The receiver lines 304 are not laid out in straight lines, as in the conventional swath method described above. The receiver lines 304 comprise a sequence of piecewise connected line segments 306 The line segments 306 are arranged in a zig-zag pattern parallel to a longitudinal axis in the inline direction. The inline direction is shown by an arrow 322, while the crossline position is shown by another arrow 324. Each line segment 306 in a receiver line 304 is symmetrically arranged along the longitudinal axis 308 parallel to the inline direction. The line segments 306 in each receiver line 304 all intersect the longitudinal axis 308 at the same specified angle 310. FIG. 3 shows an intersection angle 310 equal to 45 degrees, but other values may be used.

Seismic sources are positioned at one or more source locations 312. In the preferred embodiment, the source locations 312 are spaced along one or more source lines 314 parallel to the longitudinal axes 308 and are substantially equally spaced along each source line 314. In the preferred embodiment, if there is more than one source line 314, then the source lines 314 are substantially parallel to each other. In the preferred embodiment, if there are more than two source lines 314, then the source lines 314 are substantially equally spaced from each other. In alternative embodiments, the source lines 314 may be positioned substantially perpendicular or diagonally to the longitudinal axes 308.

Fold for the recording geometry of the present invention is calculated as for the conventional swath recording geometry by using Eqs. (1) to (3). Spacing between sources in the inline and crossline directions is the same as for the conventional swath method described above in connection with FIG. 1, since similar source locations 312 along straight source lines 314 are used. Thus the spacing between source locations 312 along the source line 314 is shown by the length 346, while the spacing between source lines is shown by the length 348. However, spacing between receivers in the inline and crossline directions must be reinterpreted. The spacing between receivers in the crossline direction is now the spacing between the associated straight lines 308 associated with each receiver line 304. The spacing between receivers in the crossline direction is shown on FIG. 3 by the length 344. The spacing between receivers in the inline direction is no longer the spacing between receiver locations 302 along the receiver lines 304, but the projection onto the inline direction. This spacing between receivers in the inline direction is shown on FIG. 3 by the length 342.

Figure 4:
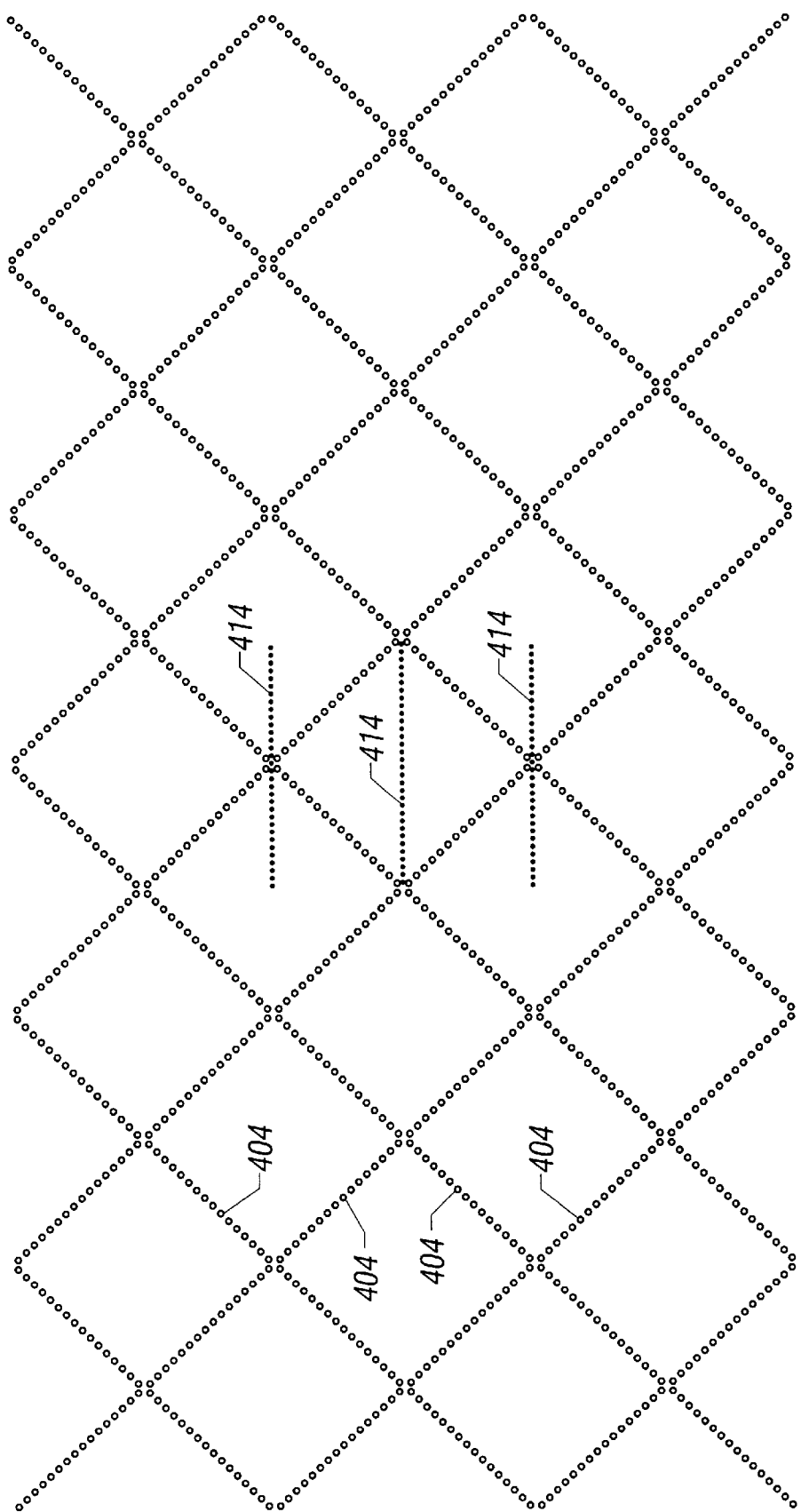
FIG. 4 is a diagrammatic view of the present invention, with 6 receiver lines and 3 source lines spaced to develop an even 3 crossline fold.
Figure 5:
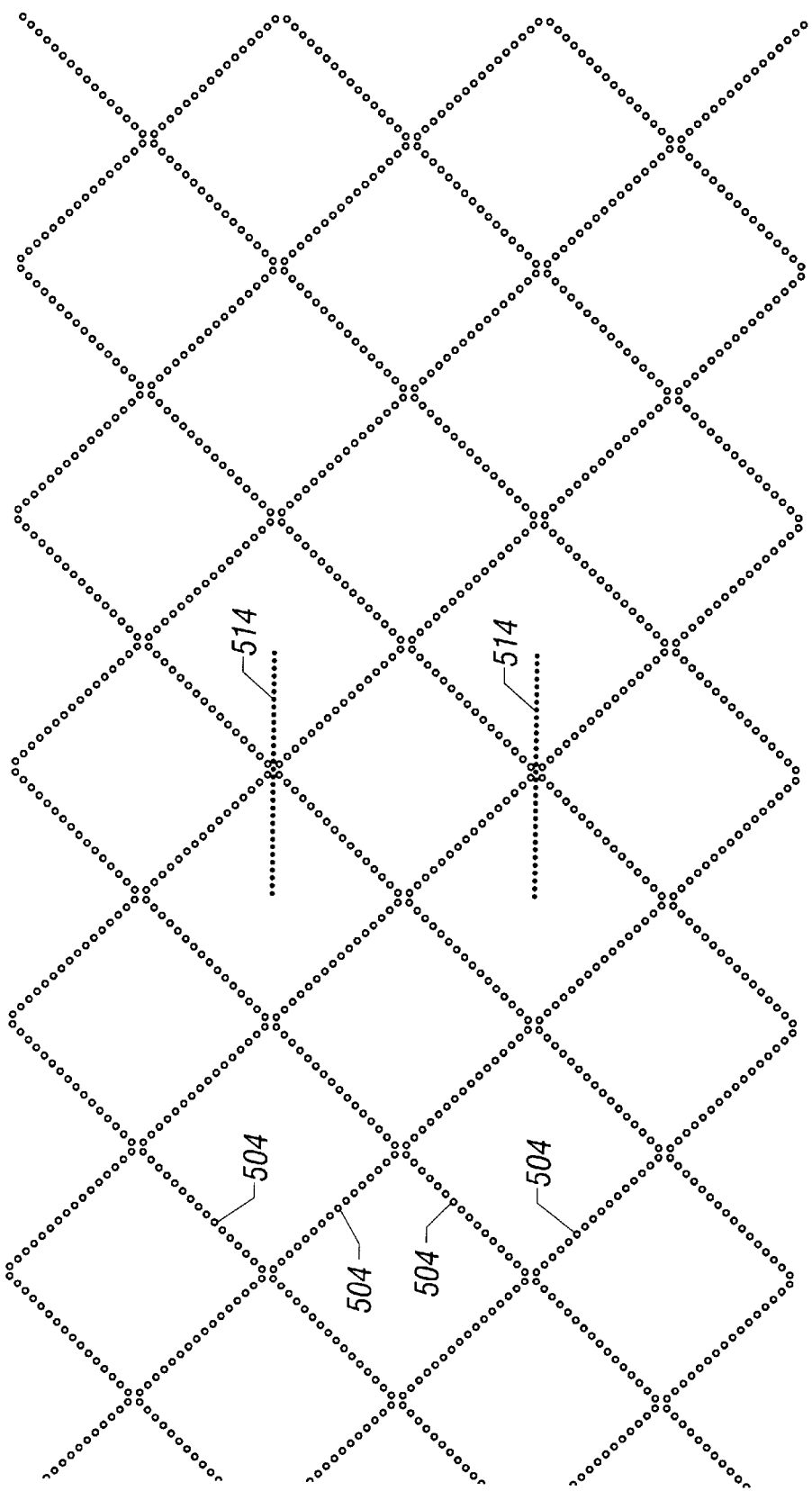
FIG. 5 is a diagrammatic view of the present invention, with 6 receiver lines and 2 source lines spaced to develop an even 2 crossline fold.

The locations of the source lines within the recording spread and the crossline roll, R, may be varied to change the fold. For example, FIG. 4 shows a six line swath with three source lines 414 which are evenly spaced with the same separation as the spacing between the receiver lines 404. If the crossline roll is three receiver lines 404, which is three times the spacing between the source lines 414, then the crossline fold developed is an even three fold, according to Eq. (2). FIG. 5 shows the same line swath with only two source lines 514 separated by a spacing equal to 1.5 times the spacing between the receiver lines 504. If the crossline roll is again three receiver lines 504, which is now twice the spacing between the source lines 514, then the crossline fold developed is now an even two fold.

Figure 6:
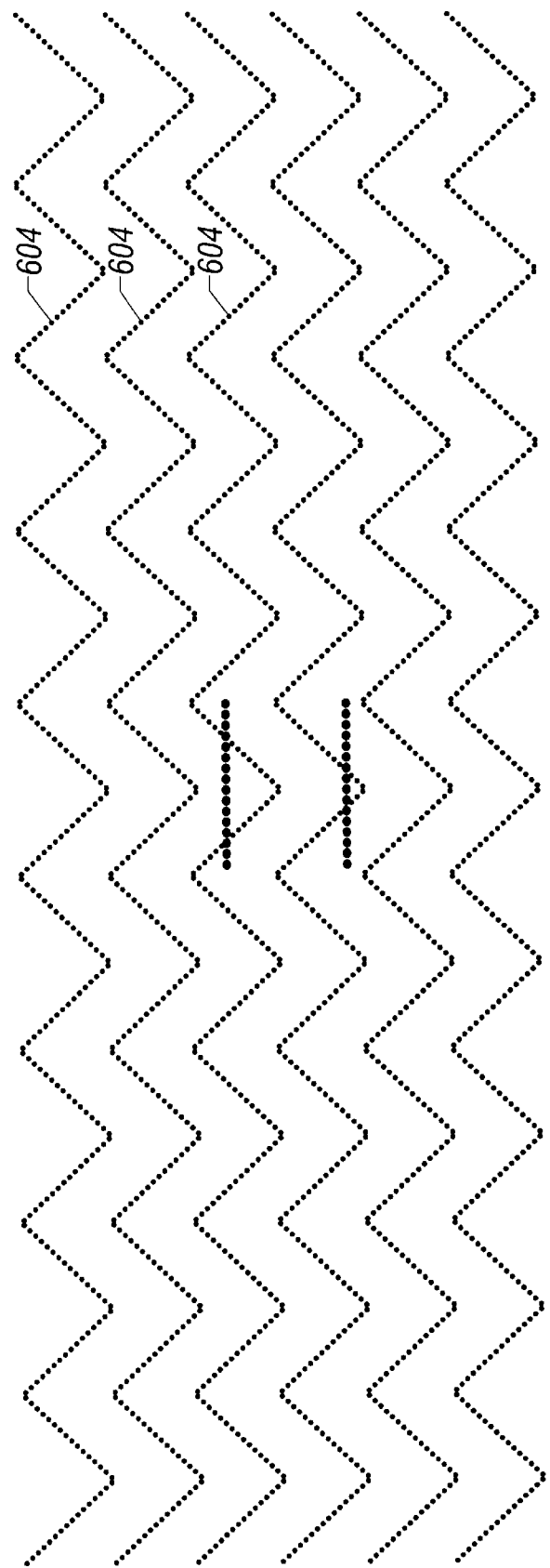
FIG. 6 is a diagrammatic view of an alternative embodiment of the present invention, where receiver lines all have the same direction of zig-zag.

Many alternatives to the above-described embodiment of the invention are intended. For example, the receiver lines may or may not maintain the same zig-zag pattern. FIG. 3 shows the orientation of zig-zag reversed on alternate receiver lines 304. FIG. 6 shows an alternative embodiment where the receiver lines 604 all have the same orientation of zig-zag. The alternative embodiment shown in FIG. 6 has some advantages in ease of combining source and receiver line spacings to yield different even folds, but may be harder to implement.

Figure 7:
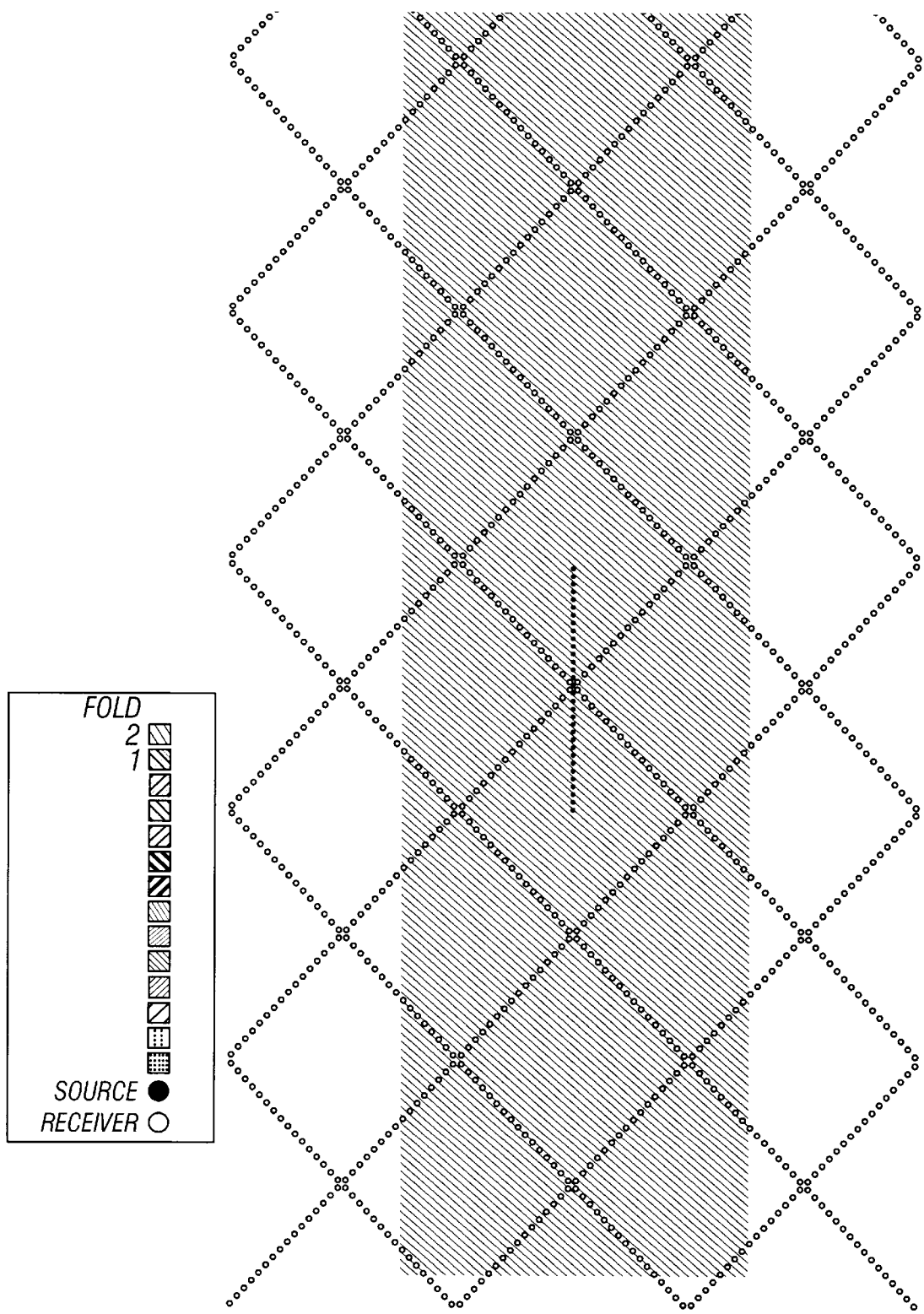
FIGS. 7–18 show alternative arrangements of seismic sources and receivers according to the method of the invention.

The invention allows increasing the fold and maintaining even fold without increasing the number of receivers. FIG. 7 shows an example of a source and receiver geometry according to the invention which yields an even two fold. The source and receiver spacing in the inline direction is the same.

Figure 8:
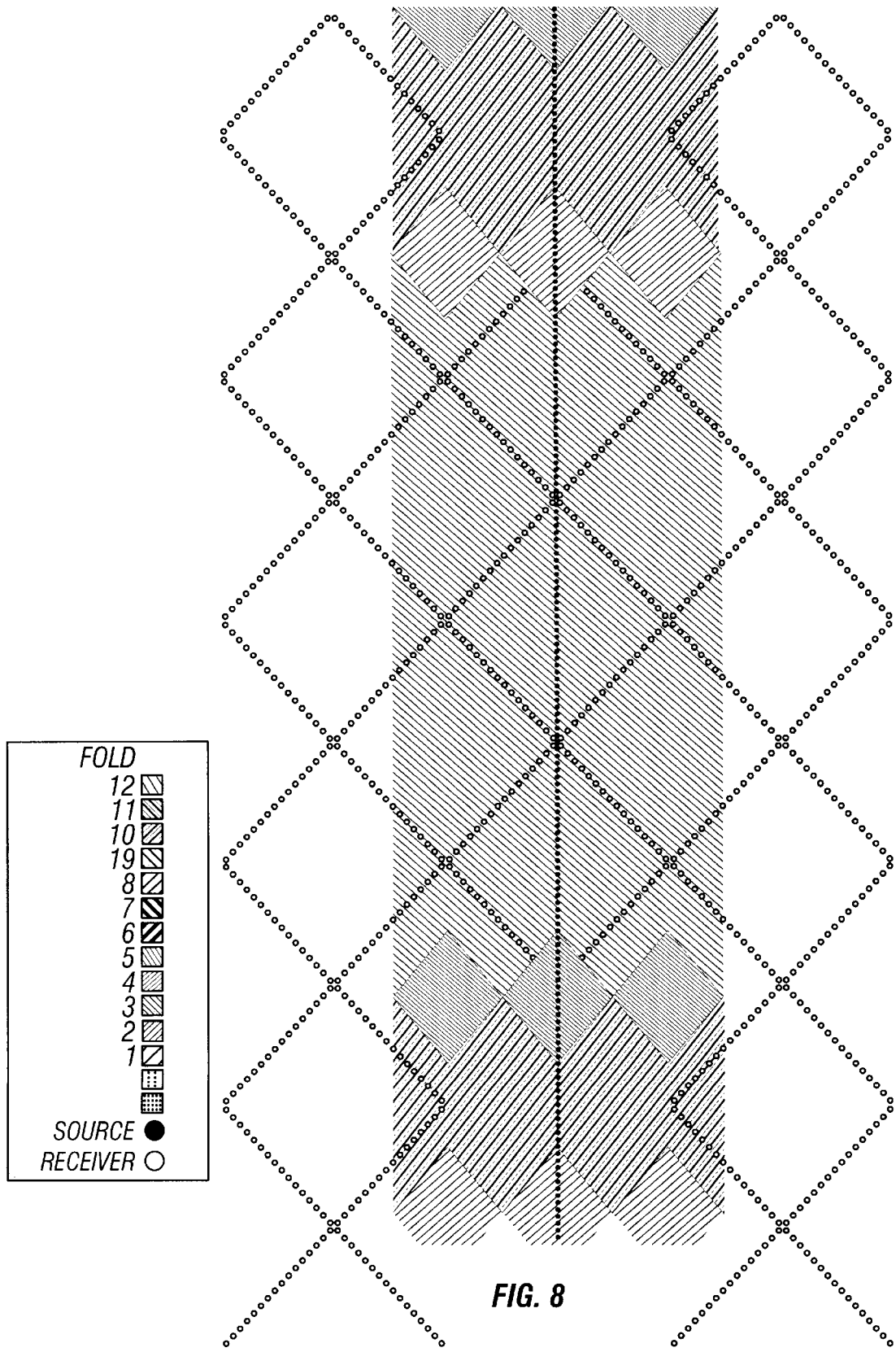

FIG. 8 shows the geometry of FIG. 7 with an inline roll. This yields an inline six fold, which increases the total fold to 2×6=12.

Figure 9:
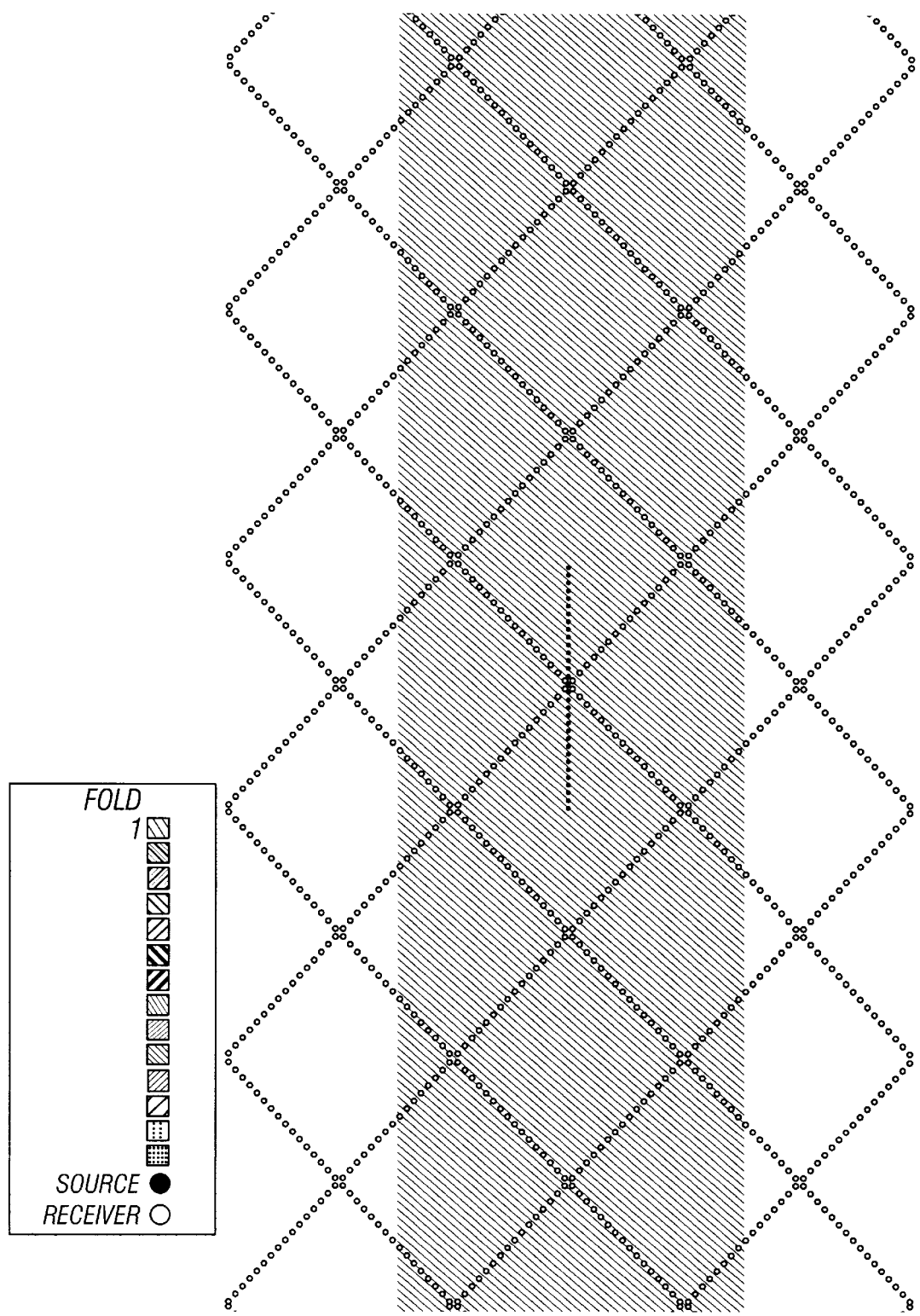

FIG. 9 shows a geometry similar to that shown in FIG. 7, except that the spacing between the sources has been doubled to twice the spacing between receivers in the inline direction. Thus this geometry yields an even one fold.

Figure 10:
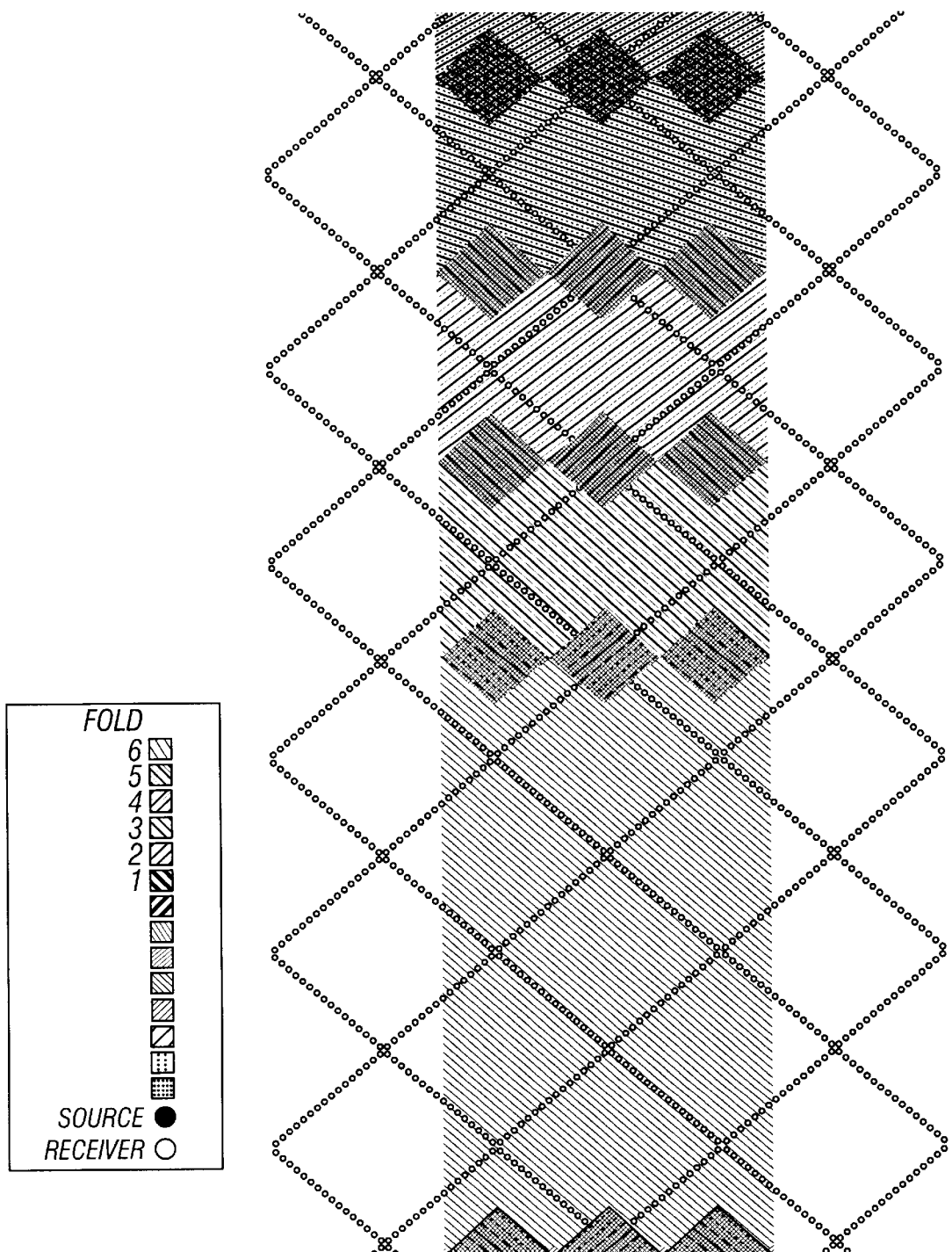

FIG. 10 shows the geometry of FIG. 9 with an inline roll. As before, an inline roll gives an inline six fold, so that the total fold is increased to 1×6=6.

Figure 11:
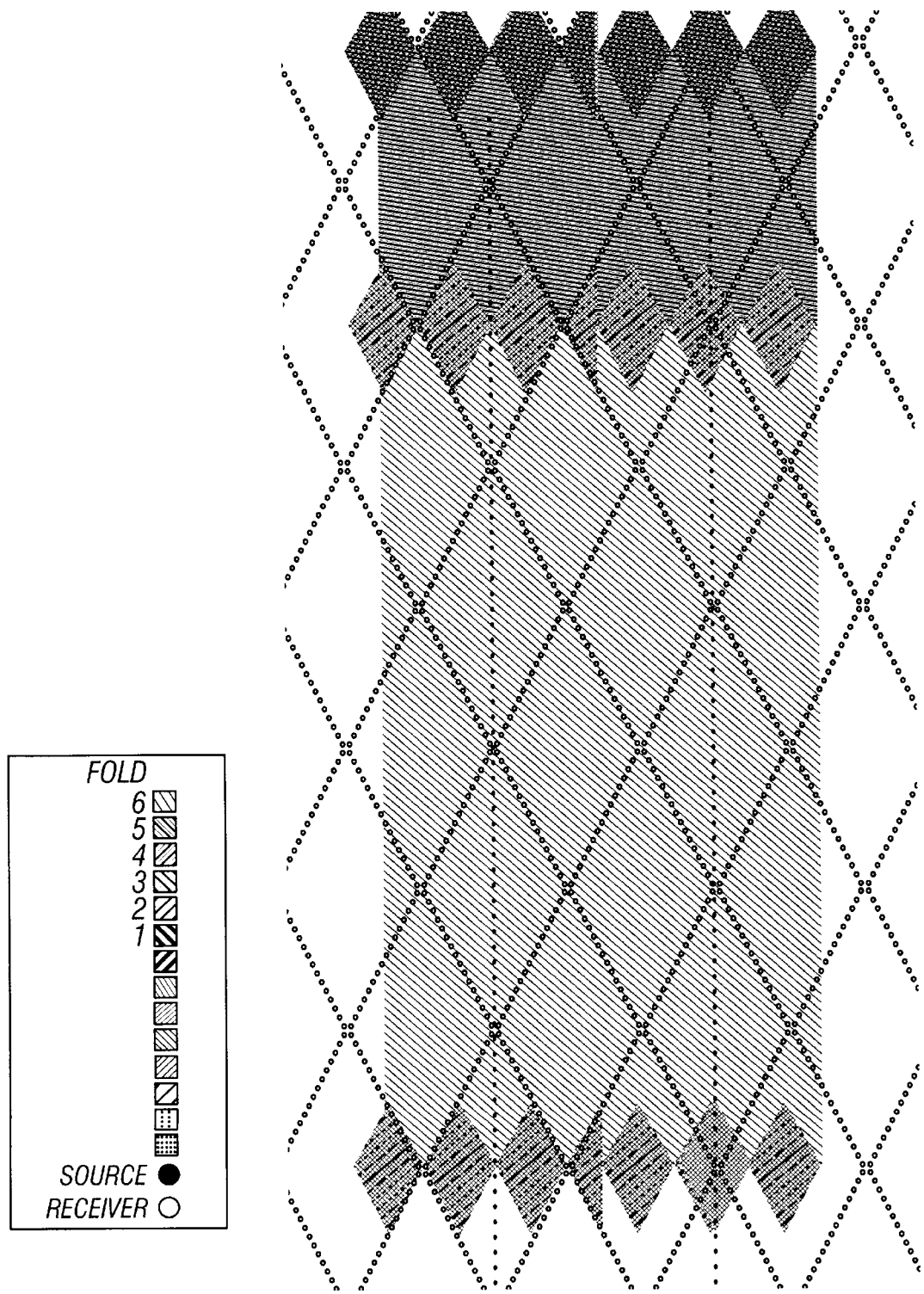

FIG. 11 shows a crossline roll of three receiver line spacings added to the geometry shown in FIG. 10. A continuous even six fold is maintained, as given by Eq. (2).

Figure 12:
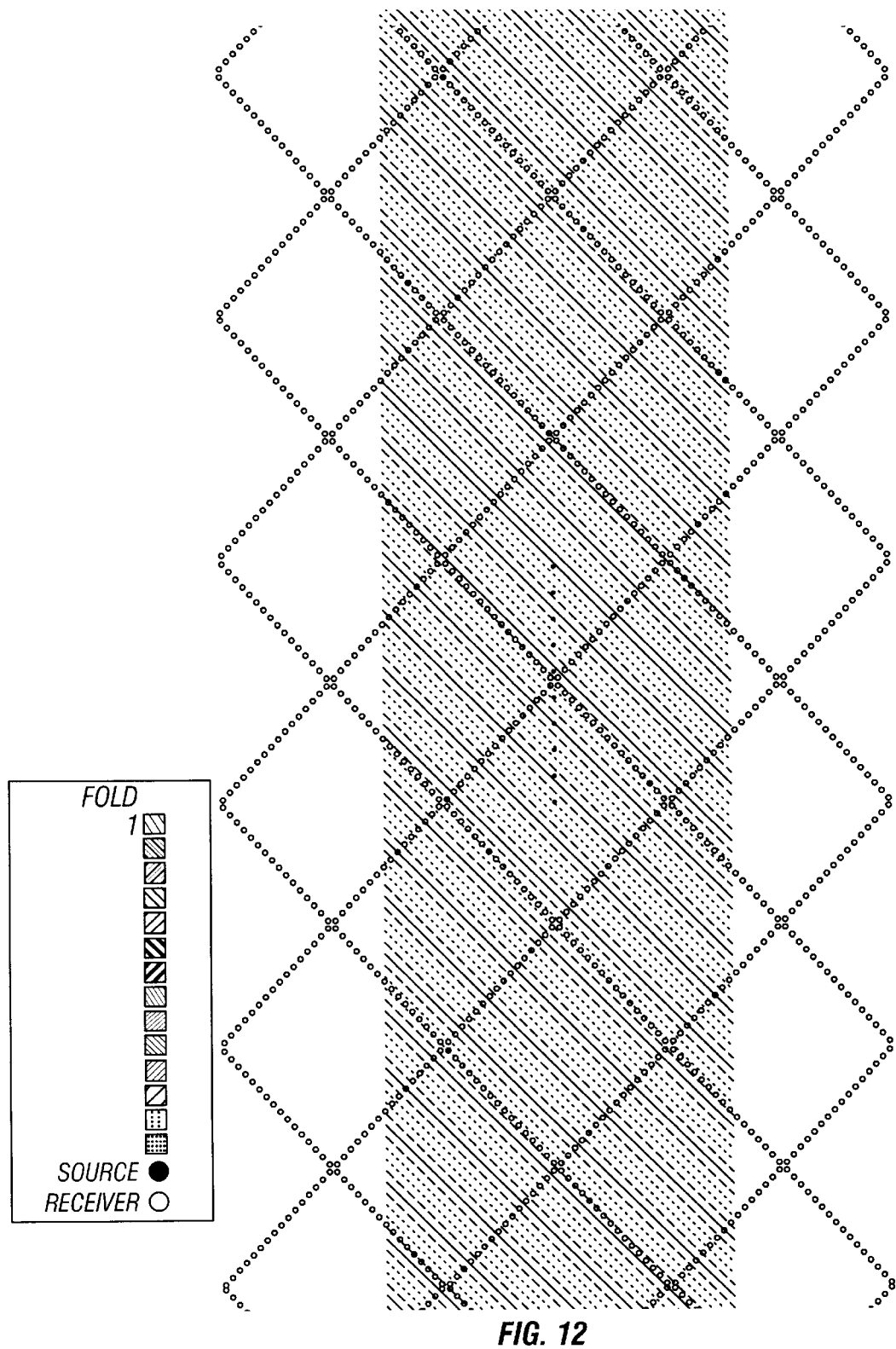

The invention allows the use of fewer sources in each source line. Properly positioned, an even fold can be maintained. FIG. 12 shows the source and receiver geometry as in FIG. 9, with the source spacing again doubled to four times the receiver spacing in the inline direction. This now yields a situation analogous to one-half fold, that is, one fold on only one-half the bins. The other half of the bins are "dead".

Figure 13:
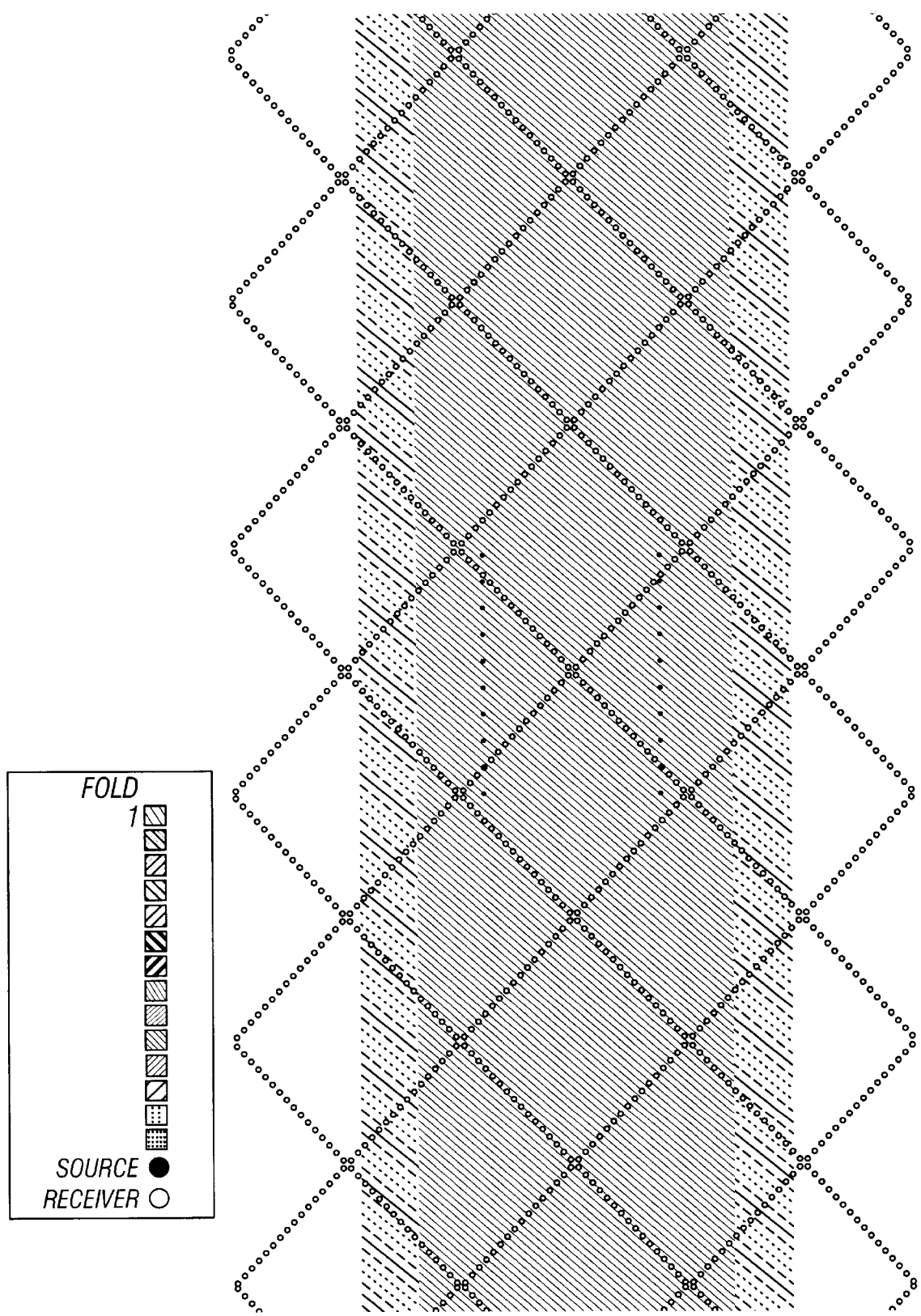

FIG. 13 shows the effect of adding another source line to the geometry of FIG. 12, with the same source spacing in the inline direction, but with staggered position as shown. Now the "live" bin cells from one source line correspond to the "dead" bin cells from the other source line. Thus an even one fold has been restored.

Figure 14:
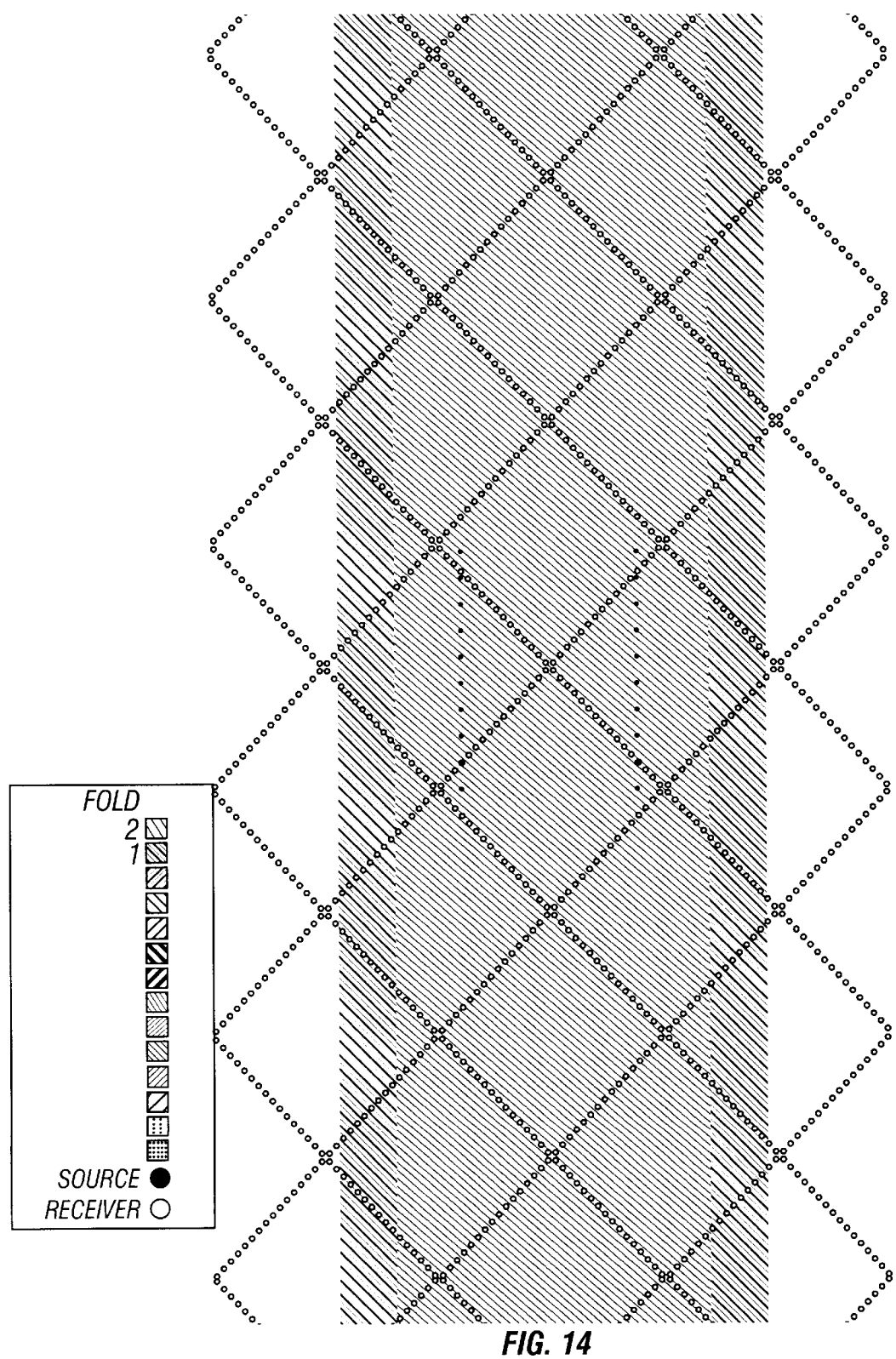
Figure 15:
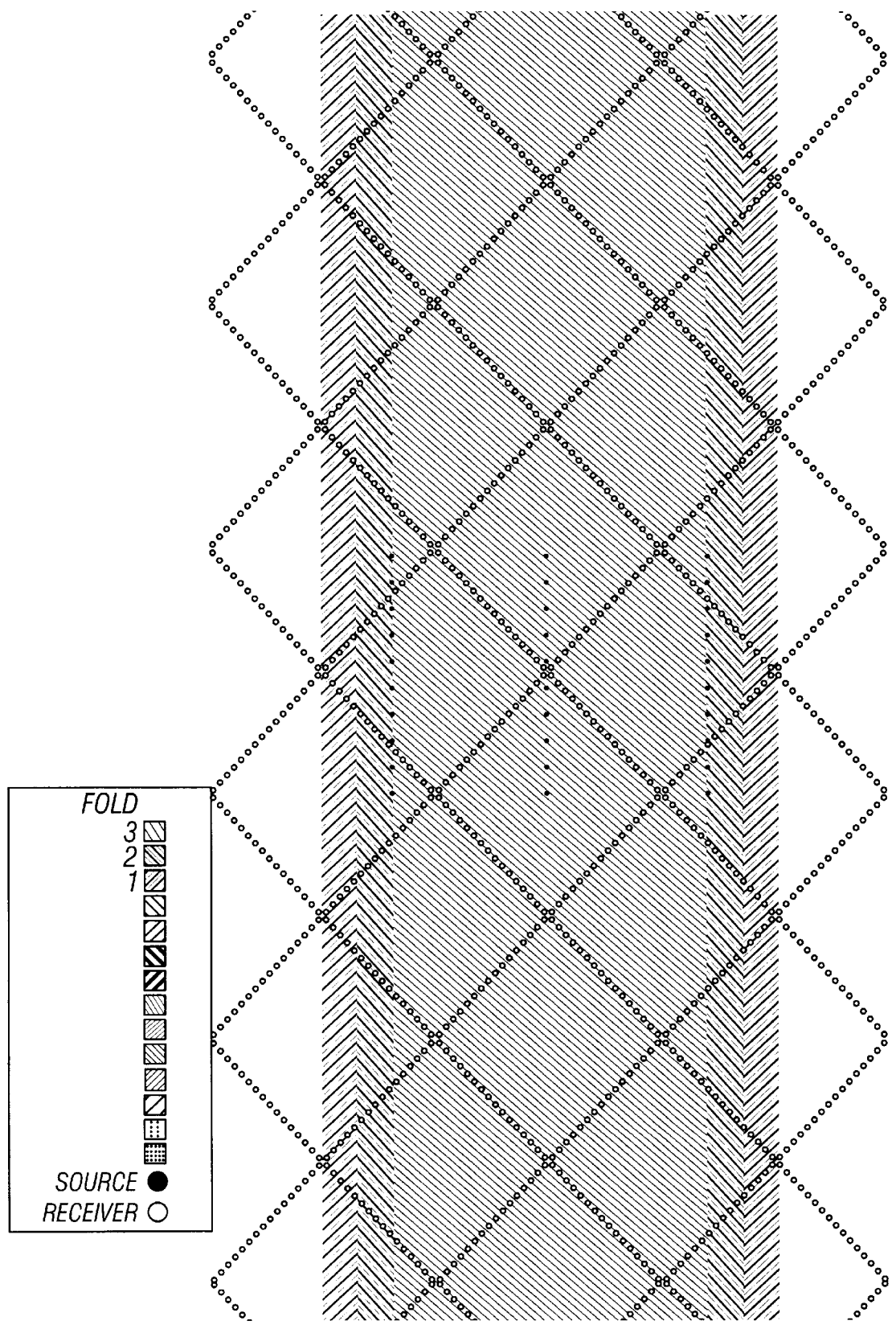
Figure 16:
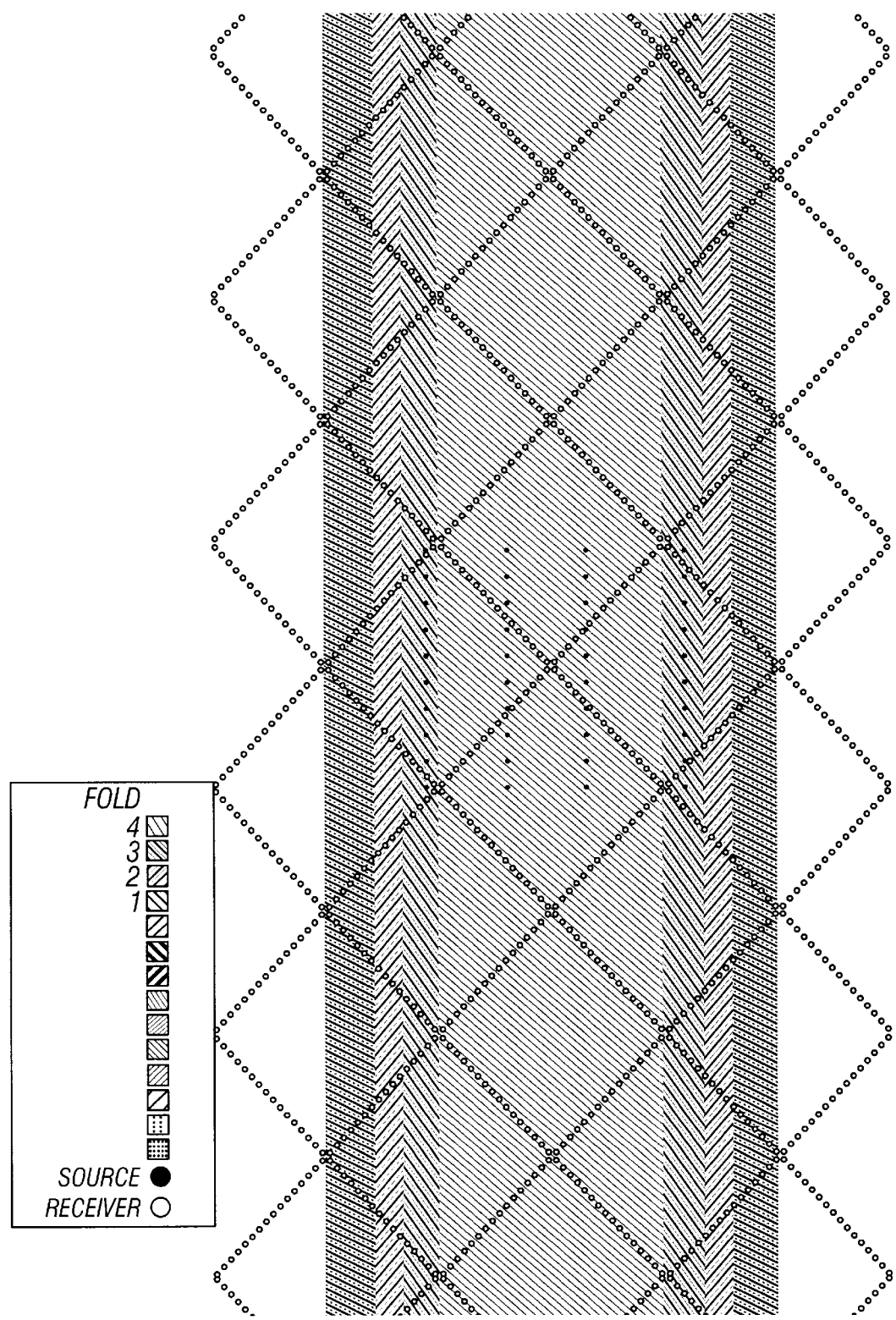
Figure 17:
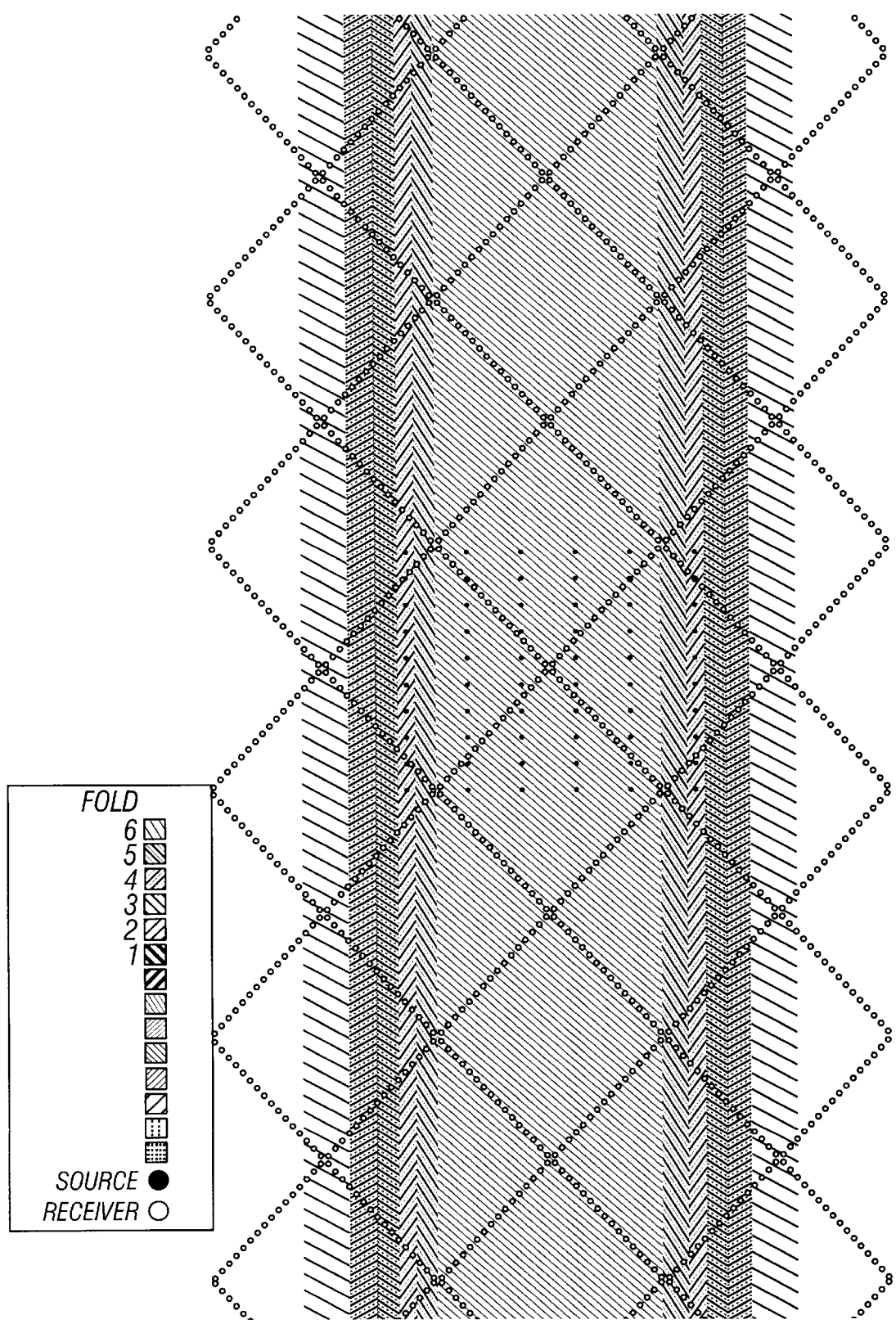

The invention allows the use of crossline roll with multiple source lines that maintains continuous even fold. FIG. 14 shows a geometry with the same relative inline spacing of sources and receivers as in FIG. 9 where, a source spacing twice the receiver spacing in the inline direction gave an even one fold. In FIG. 14, the two source lines give a crossline two fold. A three receiver line roll gives a continuous crossline two fold. The three line roll assures that the crossline one fold areas overlap to yield a continuous two fold. Thus the crossline fold is a continuous even two fold. Similarly, FIGS. 15, 16 and 17 show the effect of using three, four and six source lines to get continuous even three, four and six fold, respectively. Thus the invention allows the use of a crossline roll in which the number of source lines is not equal to the number of receiver lines which are rolled, yet a continuous even fold is still maintained.

Figure 18:
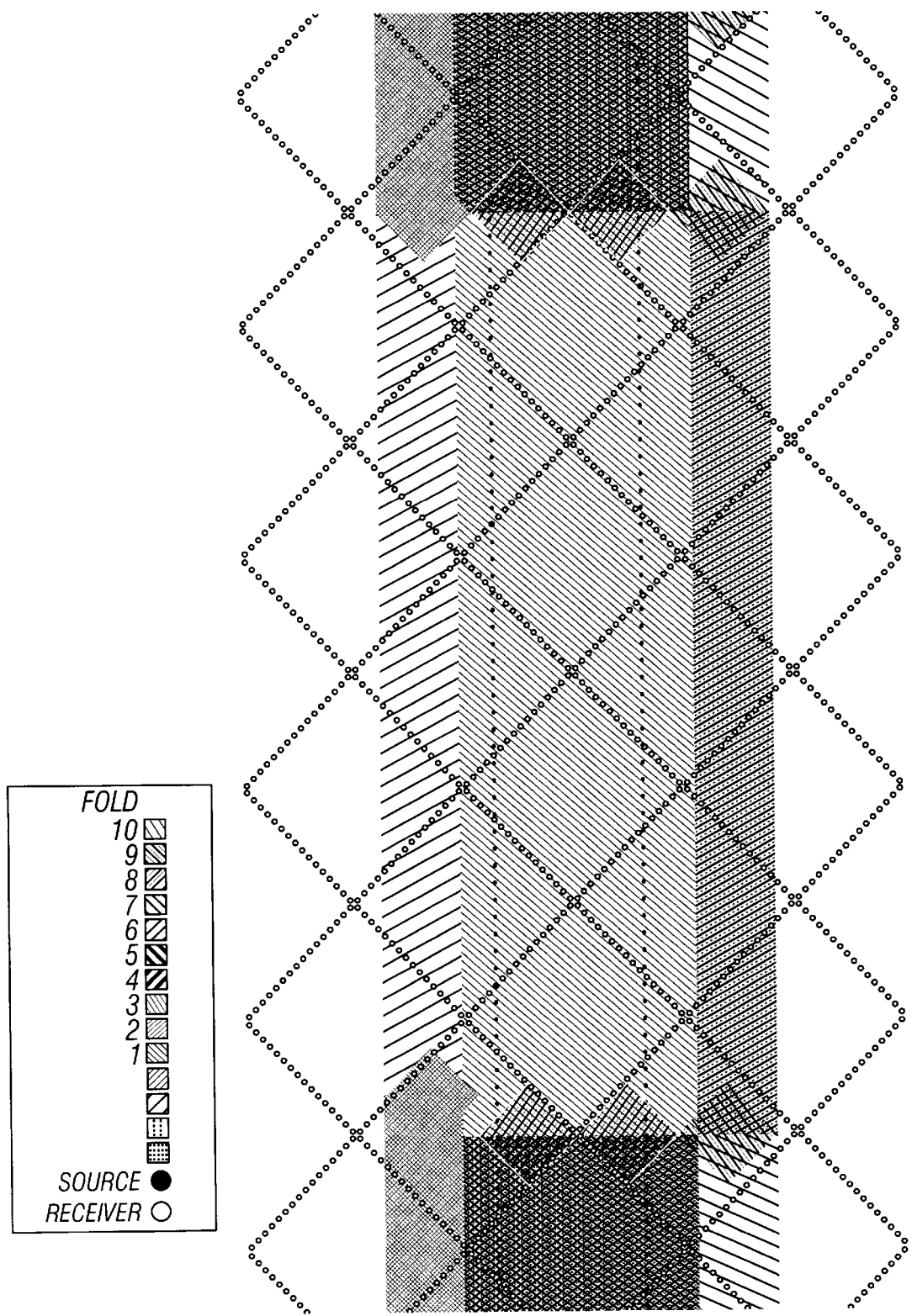

Finally, FIG. 18 shows the possibility of varying the source spacing while still maintaining even fold. In FIG. 18 the inline source spacing is twice the receiver spacing in one source line and three times the receiver spacing in the other source line. Nevertheless, the total fold is still even.

Many other alternatives to the above-described embodiments of the present invention will be described here, but these are not intended to be an exclusive list of embodiments of this invention. For example, the receiver lines may be contiguous to each other or spaced apart from each other. The receiver lines may be in phase with each other in the inline direction or may be offset from each other in the inline direction. The receiver lines may or may not overlap in the crossline direction. The crossline and inline dimensions of the zig-zag pattern need not be the same size for each receiver line. The receiver spacings need not be the same for each receiver line. Similarly, the source spacings need not be the same for each source line. More generally still, the present invention need not be confined to receiver lines in only a zig-zag pattern. The receiver lines could also be in a saw-tooth pattern, square-wave pattern, or any form of pattern of receiver locations generally extending down a straight line and extending to both sides of the straight line.

The invention has several distinct advantages over conventional recording geometries. Single or multiple lines of source locations may be positioned within a set of receiver lines such that seismic data may be recorded with an even fold which is not constrained by the same parameters as in current swath geometries. Thus the fold may be increased or decreased as signal-to-noise ratio conditions require without having to change the entire recording geometry or source line locations. The use of zig-zag or other similar patterns of receiver lines permits the use of more receivers within the usable offset range without an excessive increase in the amount of surface access, with its associated costs and environmental impact. The availability of more receivers within the usable offset range permits, in turn, a reduction in the number of seismic sources required for a given multiplicity. This reduces the overall cost of the seismic acquisition and the time required to record the survey. The availability of more receivers also increases the number of traces available per bin. Additionally, the present invention allows the benefits of being able to vary the fold without having to resurvey the source or receiver lines and thus without having to obtain new permits, such as environmental permits.

The invention has been described with a certain degree of specificity. Variations will occur to those skilled in the art which are within the scope and spirit of the invention. The invention should be limited in scope only by the attached claims.

What is claimed is:

1. A method for performing a seismic survey with even fold, comprising the steps of:

selecting an inline direction and a crossline direction perpendicular to said inline direction;

generating seismic signals at a plurality of source locations, said source locations being positioned along source lines, said source locations being substantially equally spaced in each said source line, said source lines being substantially parallel to each other;

detecting said seismic signals at a plurality of receiver locations, said receiver locations being positioned along a plurality of receiver paths each having a longitudinal axis parallel to said inline direction, said receiver locations being substantially equally spaced in each said receiver path, each said receiver path being positioned generally along said longitudinal axis, each said receiver path extending in a regular pattern to both sides of said longitudinal axis, said longitudinal axis of said receiver paths being substantially parallel to each other;

determining a desired fold, $F_i$, in said inline direction, a desired fold, $F_x$, in said crossline direction, a number of receiver recording channels, $NC_i$, available per said receiver path in said inline direction, a spacing, $RI_i$, between said receiver locations in said inline direction, a number, $NRL_x$, of said receiver paths in said crossline direction, and a number, $NS_x$, of said source locations in said crossline direction;

selecting a spacing, $SI_i$, between said source locations in said inline direction, satisfying the expression $F_i = (NC_i \times RI_i)/(2 \times SI_i)$; and selecting a spacing, $SI_x$ between said source locations in said crossline direction and a distance, $R_x$, rolled in said crossline direction, satisfying the expression $F_x = (NRL_x \times NS_x \times SI_x)/(2 \times R_x)$.

2. The method of claim 1, wherein said longitudinal axes are substantially equally spaced from each other.

3. The method of claim 1, wherein each said receiver line comprises a sequence of piecewise connected linear segments, each said linear segment intersecting said longitudinal axis at a specified angle, each said linear segment forming an angle with the adjacent linear segments in an alternate direction.

4. The method of claim 1, wherein said source lines are substantially parallel to each other and substantially equally spaced from each other.

5. The method of claim 1, wherein said sources lines are substantially parallel to said longitudinal axes.

6. A method for performing a seismic array with even fold, comprising the steps of: selecting an inline direction and a crossline direction perpendicular to said inline direction;

(a) generating seismic signals at a plurality of source locations, said source locations being positioned along source lines, said source locations being substantially equally spaced in each said source line, said source lines being substantially parallel to each other;

(b) detecting said seismic signals at a plurality of receiver locations, said receiver locations being positioned along a plurality of receiver paths each having a longitudinal axis parallel to said inline direction, said receiver locations being substantially equally spaced in each said receiver path, each said receiver path being positioned generally along said longitudinal axis, each said receiver path extending in a regular pattern to both sides of said longitudinal axis, said longitudinal axis of said receiver paths being substantially parallel to each other;

(c) for a desired fold, $F_i$, in said inline direction, a desired fold, $F_x$, in said crossline direction, a number of receiver recording channels, $NC_i$, available per said receiver path in said inline direction, a spacing $RI_i$, between said receiver locations in said inline direction, a number, $NRL_x$, of said receiver paths in said crossline direction, and a number, $NS_x$, of said source locations in said crossline direction, determining a spacing, $SI_i$, between said source locations in said inline direction, satisfying the expression $F_i=(NC_i \times RI_i)/(2 \times SI_i)$ and a spacing, $SI_x$ between said source locations in said crossline direction and a distance, $R_x$, rolled in said crossline direction, satisfying the expression $F_x=(NRL_x \times NS_x \times SI_x)/(2 \times R_x)$; and (d) recording the signals detected at said plurality of receiver locations.

7. A method for performing a seismic array with even fold, comprising the steps of: selecting an inline direction and a crossline direction perpendicular to said inline direction;

(a) generating seismic signals at a plurality of source locations, said source locations being positioned along at least a first and a second source line, said source locations being substantially equally spaced in each said source line, said source lines being substantially parallel to each other;

(b) detecting said seismic signals at a plurality of receiver locations, said receiver locations being positioned along a plurality of receiver paths each having a longitudinal axis parallel to said inline direction, said receiver locations being substantially equally spaced in each said receiver path, each said receiver path being positioned generally along said longitudinal axis, each said receiver path extending in a regular pattern to both sides of said longitudinal axis, said longitudinal axis of said receiver paths being substantially parallel to each other; and (c) for a plurality of receiver recording channels available per said receiver path in said inline direction, a spacing between said receiver locations in said inline direction, a number of said receiver paths in said crossline direction, and a number of said source locations in said crossline direction, determining a first spacing between said source locations for the at least first source line and a second spacing different from the first spacing between said source locations for the at least second source line in said inline direction, and a spacing between said source locations in said crossline direction to provide a desired multiplicity of coverage.

8. A method for performing a seismic array with even fold, comprising the steps of: selecting an inline direction and a crossline direction perpendicular to said inline direction;

(a) generating seismic signals at a plurality of source locations, said source locations being positioned along source lines, said source locations being substantially equally spaced in each said source line, said source lines being substantially parallel to each other;

(b) detecting said seismic signals at a plurality of receiver locations, said receiver locations being positioned along a plurality of receiver paths each having a longitudinal axis parallel to said inline direction, said receiver locations being substantially equally spaced in each said receiver path, each said receiver path being positioned generally along said longitudinal axis, each said receiver path extending in a regular pattern to both sides of said longitudinal axis, said longitudinal axis of said receiver paths being substantially parallel to each other, said source lines being located within a boundary defined by the longitudinal axes of the receiver paths;

(c) for a plurality of receiver recording channels available per said receiver path in said inline direction, a spacing between said receiver locations in said inline direction, a number of said receiver paths in said crossline direction, and a number of said source locations in said crossline direction, determining a spacing between said source locations in said inline direction and a spacing between said source locations in said crossline direction and a distance rolled in said crossline direction, providing a desired multiplicity of the data.

9. The method of claim 1 wherein the receiver paths are contiguous.

10. The method of claim 1 wherein the receiver paths are spaced apart.

11. The method of claim 1 wherein the receiver paths are in phase with each other.

12. The method of claim 1 wherein the plurality of receivers in a receiver path are offset in an inline direction from plurality of receivers of a receiver path in an adjacent receiver path.

13. The method of claim 6 wherein said longitudinal axes are substantially equally spaced from each other.

14. The method of claim 6, wherein each said receiver line comprises a sequence of piecewise connected linear segments, each said linear segment intersecting said longitudinal axis at a specified angle, each said linear segment forming an angle with the adjacent linear segments in an alternate direction.

15. The method of claim 6, wherein said source lines are substantially parallel to each other and substantially equally spaced from each other.

16. The method of claim 6, wherein said source lines are substantially parallel to said longitudinal axes.

17. The method of claim 8 wherein said longitudinal axes are substantially equally spaced from each other.

18. The method of claim 8, wherein each said receiver line comprises a sequence of piecewise connected linear segments, each said linear segment intersecting said longitudinal axis at a specified angle, each said linear segment forming an angle with the adjacent linear segments in an alternate direction.

19. The method of claim 8, wherein said source lines are substantially parallel to each other and substantially equally spaced from each other.

20. The method of claim 8, wherein said source lines are substantially parallel to said longitudinal axes.

* * * * *

UNITED STATES PATENT AND TRADEMARK OFFICE
CERTIFICATE OF CORRECTION

PATENT NO : 6,028,822
DATED : February 22, 2000
INVENTOR(S) : Roy M. Lansley, Gary J. Elkington and Nicholas J. Battaglino, III It is certified that error appears in the above-identified patent and that said Letters Patent is hereby corrected as shown below:

Column 8, line 24 please delete "even" and insert therefor --uniform--.

Column 9, line 6 please delete "even" and insert therefor --uniform--.

Column 9, line 42 please delete "even" and insert therefor --uniform--.

Column 10, line 10 please delete "even" and insert therefor --uniform--.

Signed and Sealed this

Twenty-seventh Day of March, 2001

*Attest:*

NICHOLAS P. GODICI

*Attesting Officer*   *Acting Director of the United States Patent and Trademark Office*